United States Patent Office 2,730,312
Patented Jan. 10, 1956

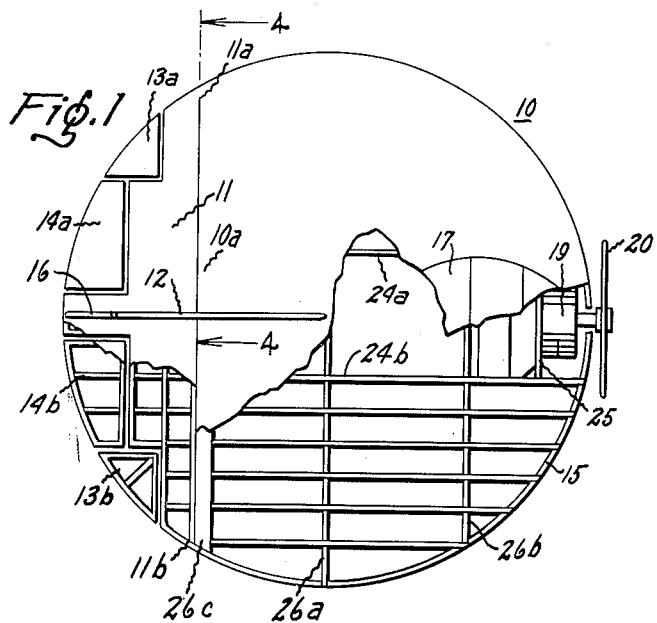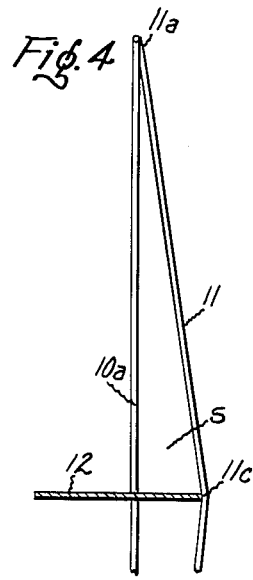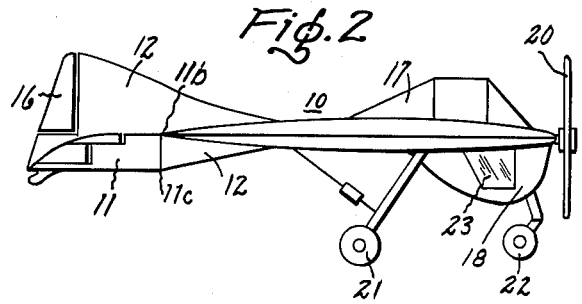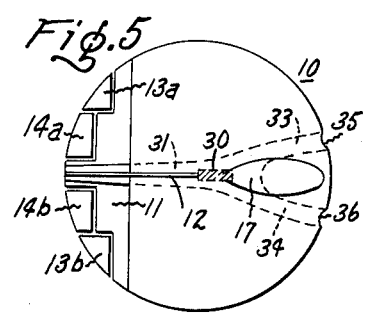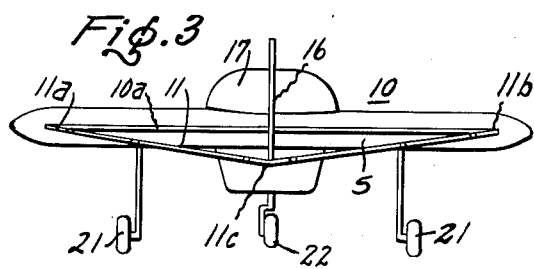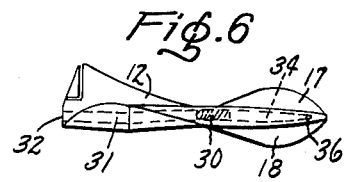
Inventor
Le Roy W Crookes

2,730,312

DISCOID-SHAPED AIRCRAFT

Le Roy W. Crookes, Scotia, N. Y.

Application November 23, 1953, Serial No. 393,881

3 Claims. (Cl. 244—13)

This invention relates to aircraft, particularly of the heavier-than-air type, and one of the objects is to provide an improved discoid form of aircraft that will appear to be substantially circular in shape when viewed from the top or bottom and thus in flight appears as a "flying saucer."

Another object of the invention is to provide an improved flying saucer type of aircraft having a main air foil of truncated disc or discoid shape to provide a circular leading edge combined with a complementary trailing segmental dihedral horizontal stabilizer as well as an interconnecting vertical stabilizer in order to obtain inherent structural ruggedness, as well as inherent stability in flight, slower landing speeds, increased and more economical cruising speeds, and also to enable all the necessary structural members to be enclosed within the main air foil and stabilizer surfaces.

In a passenger carrying aircraft embodying the present invention, the engine and passengers' compartment may be partly or entirely closed within the main air foil surfaces depending upon the relative size and thickness of the main air foil of the aircraft which may be powered by a jet reciprocating engine driven propeller, or flown as a glider, but the improved form of aircraft may be built in any size from a small model glider or model-miniature engine driven craft up to a large transport capable of carrying maximum loads.

In each case the invention resides in the improved substantially truncated main disc or discoid air foil and the complementary trailing stabilizer structural combinations as set forth in the ensuing disclosure and having with the above other objects and advantages as hereinafter pointed out. The improved construction details and the manner of cooperation of the components will be made manifest in the following description of the illustrated embodiments; it being understood that modification, variation and adaptation may be resorted to within the scope, spirit and principle of the invention as it is claimed in conclusion hereof.

In the drawing, Fig. 1 is a plan view of a typical propeller driven two passenger-carrying "flying saucer" embodying the invention. Fig. 2 is a side elevation of the aircraft shown in Fig. 1. Fig. 3 is a rear elevation of the aircraft structure shown in Fig. 1. Fig. 4 is a partial sectional view along the lines 4—4 looking in the direction of the arrow in order to show more clearly the dihedral form of the segmental shaped horizontal stabilizer. Figs. 5 and 6 show a typical jet propelled form of the "flying saucer" embodying the improvements of the present invention.

In accordance with the principles of the present invention, the main flight or lifting air foil generally designated by the reference character 10 is made substantially of truncated disc or discoid shape to provide a circular leading edge and a linear trailing edge 10a as shown in Fig. 1 and preferably provided with a suitable peripheral taper at all of its edges as shown in Figs. 2 and 3 in order to increase the aerodynamic efficiency. The horizontal stabilizer indicated generally by the reference character 11 is shaped as a complementary trailing segment to the air foil 10 as shown in Fig. 1 and is of dihedral form as indicated in Figs. 3 and 4. The depressed or offset center 11a of the dihedral horizontal stabilizer 11 is joined to and supported by the bottom of the vertical stabilizer 12 that extends from the air foil 10 normal to the linear trailing edge 10a thereof. The dihedral surfaces of the segmental horizontal stabilizer are inclined so as to provide a negative angle of attack relative to the main air foil 10. Thus with this dihedral construction the air can flow in normal level flight from the under side of the main air foil 10 to the upper side of the dihedral horizontal stabilizer 11. The tips 11a and 11b thereof are joined to and firmly supported by the ends of the linear trailing edge 10a of the main air foil. Such improved construction gives the whole aircraft inherent ruggedness since the component elements cooperate to mutually reinforce each other. The ruggedness of the whole aircraft is further increased by the reinforced circular structural member 15 which circumferentially encloses substantially the entire main air foil 10 and extends therefrom so as to connect the tips 11a and 11b of the segmental horizontal stabilizer 11 to the ends of the linear trailing edge 10a of the main air foil 10. The trailing edge of the horizontal stabilizer 11 is symmetrically notched so as to have inserted therein the relatively movable semi-segmental elevators 14a, 14b and the ailerons 13a and 13b that are used for controlling the path and attitude of the aircraft in flight and still provide an overall circular configuration.

In order to house passengers, a suitable canopy 17 may be provided on the upper side of the main wing 10, and a suitable foot well 18 on the lower side so as to form an enclosed compartment as shown in Fig. 2 in case the wing 10 is of insufficient thickness to house the passengers completely therein. A suitable engine 19 may be enclosed within the center of the leading edge of the main wing 10 with the shaft extended to drive the propeller 20. The landing gear may be of the conventional three-point type comprised of the two main wheels 21 and the nose wheel 22.

The improved aircraft construction is inherently rugged due to the omission of long or thin air foil members and the fact that the whole outer periphery of the "flying saucer" is a reinforced continuous generally circular structural member except for the inserted ailerons and elevators. The dihedral or V shape of the horizontal stabilizer 11, as viewed from the back in Fig. 3 inherently adds rigidity to the vertical stabilizer 12 and vice versa and also inherently forms a laterally tapered air slot generally indicated as s in Figs. 3 and 4 that gives each stabilizer as well as the other control elements carried thereby a fresh supply of air to insure more accurate and better control under adverse flying conditions.

When built the 18-foot diameter improved "flying saucer" becomes equivalent to the standard light personal plane of today. Both may be powered with a 65 to 125 H. P. engine. Both will carry two to four people. The standard airplane requires a wing span of approximately 36 feet, while in comparison the "flying saucer" requires only an 18-foot wing span but provides 50 percent more effective wing area. This enables the improved craft to land at a slower speed in areas which would otherwise be inaccessible to the usual craft of today. Typical details of construction suitable for an 18-foot diameter "flying saucer" of the improved form shown in Figs. 1, 2, 3 and 4 may be as follows.

Practically the entire outer edge of the ship may be formed of a strong continuous aluminum tube 15 formed into substantially circular shape so as to extend entirely around the leading edge of the main air foil 10 and back to the ailerons 13a and 13b. Preferably a pair of main ribs 24a and 24b are extended perpendicularly from the linear trailing edge 10a of the main air foil 10 on either side of the passenger compartment as indicated in Fig. 1.

The main ribs 24 are preferably formed of light aluminum tubing suitably curved into an air foil shape as shown in Fig. 2 and are reinforced in the usual way with cross braces of aluminum tubing. The engine bulkhead 25 is mounted between these two main ribs. The pair of main spars 26a and 26b are made of aluminum bridge type construction. One spar 26a preferably is located as shown in Fig. 1 at the transverse diameter of the discoid main air foil 10 which is perpendicular to the line of flight and parallel to the linear trailing edge 10a thereof. The other spar 26b preferably is located immediately in back of the passenger compartment. From this spar 26b the main landing gear is mounted. The trailing edge 10a of the main lifting air foil 10 preferably is formed by a linear triangularly shaped aluminum beam 26c. The main air foil 10 may be covered with suitable fabric or thin aluminum sheet except the area next to the cockpit which is covered with reinforced aluminum so it can be used as a catwalk. The foot well 18 preferably is made of aluminum tubing covered with fabric. The floor boards inside of the foot well may be made of corrugated aluminum. The canopy 17 preferably is made of transparent molded plastic with the central section movable for the entrance of the passengers. Preferably there are also the plastic glass windows 23 in the lateral surfaces of the foot well 18 to provide increased visibility. These are shown in Fig. 2 and indicated as 23.

The main landing wheel gear 21 is mounted to the forward main spar 26b and the shock absorber is mounted to the aft main spar 26a. The nose wheel gear 22 may be mounted to the engine bulkhead 25. The landing gear may be of the stationary or retractable type.

The vertical stabilizer 12 is made of aluminum tubing and joined securely to the spars 26a and 26c. The base of this stabilizer 12 at the trailing edge 10 of the main air foil is approximately 1½ feet below the trailing edge 10a and is formed approximately at a 3-degree negative angle of attack so as to support the depressed or offset center 11a of the horizontal dihedral stabilizer 11 of segmental form. As previously pointed out, this construction enables the vertical stabilizer to reinforce the horizontal stabilizer and vice versa. Each stabilizer preferably is fabric covered. The rudder 16 carried by the vertical stabilizer 12 may be made of aluminum tubing and fabric covered. The dihedral and segmental horizontal stabilizer 11 is made of aluminum tubing and fabric covered and the depressed center 11c of this stabilizer mounts rigidly to the base of the vertical stabilizer 12. With the tips 11a and 11b of the horizontal stabilizer mounted to the ends of the linear trailing edge of the main air foil 10, the dihedral surfaces of the horizontal stabilizers 11 are therefore mounted at approximately a 15-degree angle to each other.

When built in accordance with the principles of the present invention, the improved "flying saucer" will land in a shorter and smaller area than conventional craft of today, has a lower landing speed, requires less takeoff run, is more economical at cruising altitudes, and is virtually stall, spin and ground loop proof.

In the jet propelled form of flying saucer shown in Figs. 5 and 6, the main air foil 10 and the trailing horizontal stabilizer 11 and the vertical stabilizer 12 have the same aerodynamic relations as previously described, but their internal construction is slightly modified. Thus the jet engine 30 is enclosed within the main air foil 10 behind the passenger compartment formed by the canopy 17 and the foot well 18, and is provided with a tail pipe 31 that extends aft through the lower part of the vertical stabilizer 12 so that the propelling jet may be exhausted at 32 between the elevators 14a and 14b in substantial alignment with the flight axis of the aircraft. Combustion air is supplied to the jet engine 30 through forked air passages 33 and 34 that extend inside of the main air foil 10 on opposite sides of the passenger compartment, and are provided with the air inlet openings 35 and 36 located adjacent the leading circular edge of the main air foil 10.

What I claim as new and desire to secure by Letters Patent of the United States, is:

1. An aircraft having in combination, a main air foil of truncated discoid planform to provide a circular leading edge, a trailing horizontal stabilizer of complementary trailing segmental form having the tips thereof joined to the ends of the trailing edge of the main air foil and having the center thereof depressed from the trailing edge of the main air foil, and a vertical stabilizer extending substantially diametrically from the main air foil midway of the trailing edge thereof to support the depressed center of the horizontal stabilizer.

2. An aircraft having in combination, a main air foil of substantially truncated discoid planform to provide a circular tapered leading edge and a linear tapered trailing edge, a complementary trailing segmental horizontal stabilizer of dihedral form having the tips thereof joining and supported by the ends of the linear trailing edge of the main air foil to offset the center thereof from the linear trailing edge of the main air foil, and a vertical stabilizer extending diametrically from the main air foil normally midway of the linear trailing edge thereof to support the offset center of the dihedral horizontal stabilizer.

3. An aircraft having in combination, a main air foil of substantially truncated discoid planform having a substantially linear trailing edge and provided with spaced beams extending perpendicular to the trailing edge and transverse spars extending parallel with the trailing edge and having a circular edge supporting member joined to the ends of the beams and spars and extending beyond the trailing edge of the main air foil, a complementary segmental horizontal stabilizer of dihedral form having the tips thereof supported by the extended ends of the circular edge supporting member of the main air foil and having the center of the dihedral offset from the linear trailing edge of the main air foil, and a vertical stabilizer mounted on the spars to extend substantially diametrically from the main air foil midway of the linear trailing edge thereof to support the offset center of the dihedral horizontal stabilizer.

References Cited in the file of this patent

UNITED STATES PATENTS

| 1,523,994 | Myers | Jan. 20, 1925 |
| 1,887,411 | Johnson | Nov. 8, 1932 |
| 1,981,700 | Hoffman | Nov. 20, 1934 |

FOREIGN PATENTS

| 5,282 | Great Britain | of 1912 |
| 2,421 | Great Britain | of 1914 |